(12) United States Patent
Goldner et al.

(10) Patent No.: US 8,249,505 B1
(45) Date of Patent: Aug. 21, 2012

(54) METHOD AND APPARATUS FOR SELECTING A MODE IN A MULTI-MODE COMMUNICATIONS CLIENT

(75) Inventors: Alla Goldner, Tel Aviv (IL); Penny Efraim-Sagi, Moshav Gan-Haim (IL)

(73) Assignee: Marvell International Ltd., Hamilton (BM)

( * ) Notice: Subject to any disclaimer, the term of this patent is extended or adjusted under 35 U.S.C. 154(b) by 477 days.

(21) Appl. No.: 12/403,693

(22) Filed: Mar. 13, 2009

Related U.S. Application Data (60) Provisional application No. 61/036,240, filed on Mar. 13, 2008, provisional application No. 61/061,014, filed on Jun. 12, 2008.

(51) Int. Cl.
*H04B 7/00* (2006.01)
(52) U.S. Cl. .................................................. 455/41.2
(58) Field of Classification Search ............... 455/41.2, 455/41.3, 444, 552.1, 553.1
See application file for complete search history.

(56) References Cited

U.S. PATENT DOCUMENTS
7,653,350 B2 * 1/2010 Camp, Jr. ................... 455/41.2

OTHER PUBLICATIONS

Anex to ITU Operationsl Bulletin No. 835—1.V.2005; International Telecommunication Union; ITU-T Telecommuncation Standardization Sector of ITU; Complement to ITU-T Recommendation E.164 (Feb. 2005); List of ITU-T Recommendations E.164 Assigned Country Codes (Position on May 1, 2005); 19 pages.
RFC 3261; SIP: Session Initiation Protocol; J. Rosenberg, dynamicsoft; H. Schulzrinne, Columbia U.; G. Camarillo, Ericsson; A. Johnston, Worldcom; J. Peterson, Neustar; R. Sparks, dynamicsoft; M. Handley, ICIR; E. Schooler, AT&T; Jun. 2002; 269 pages.
Enabler Release Definition for OMA Device Management; Candidate Version 1.2-02; Jun. 2006; Open Mobile Alliance; OMA-ERELD-DM-V1_2-20060602-C; 15 pages.
3GPP TS 23.292 V9.0.0 (Dec. 2008); $3^{rd}$ Generation Partnership Project; Technical Specification Group Services and System Aspects; IP Multimedia Subsystem (IMS) centralized services; Stage 2 (Release 9) 103 pages.
3GPP TS 23.228 V8.7.0 (Dec. 2008); $3^{rd}$ Generation Partnership Project; Technical Specification Group Services and System Aspects; IP Multimedia Subsystem (IMS); Stage 2 (Release 8) 244 pages.
3GPP TS 22.258 V8.0.0 (Mar. 2006); $3^{rd}$ Generation Partnership Project; Technical Specification Group Services and System Aspects; Service Requirements for the All-IP Network (AIPN); Stage 1; (Release 8) 24 pages.
3GPP TS 22.101 9.2.0 (Dec. 2008); 3rd Generation Partnership Project; Technical Specification Group Services and System Aspects; Service aspects; Service principles; (Release 9) 55 pages.
3GPP TR 21.905 V9.0.0 (Dec. 2008); 3rd Generation Partnership Project; Technical Specification Group Services and System Aspects; Vocabulary for 3GPP Specifications; (Release 9) 57 pages.

(Continued)

*Primary Examiner* — Robert Pascal
*Assistant Examiner* — Khiem Nguyen (57) ABSTRACT

A wireless terminal includes a wireless interface that is configured to selectively connect the wireless terminal to a network using one of at least two different access modes including a cellular access mode and at least one non-cellular access mode. A mode control that selects the one of the at least two different access modes based at least in part on an access priority signal received from the network.

18 Claims, 6 Drawing Sheets

OTHER PUBLICATIONS

3GPP TS 23.206 V7.2.0 (Mar. 2007); 3rd Generation Partnership Project; Technical Specification Group Services and System Aspects; Voice Call Continuity (VCC) between Circuit Switched (CS) and IP Multimedia Subsystem (IMS); Stage 2 (Release 7) 36 pages.

3GPP TR 23.893 V1.1.1 (Feb. 2008); 3rd Generation Partnership Project; Technical Specification Group Services and System Aspects; Feasibility Study on Multimedia Session Continuity; Stage 2 (Release 8) 55 pages.

3GPP TS 43.318 V7.0.0 (Nov. 2006); 3rd Generation Partnership Project; Technical Specification Group GSM/EDGE Radio Access Network; Generic access to the A/Gb interface; Stage 2 (Release 7) 71 pages.

* cited by examiner

METHOD AND APPARATUS FOR SELECTING A MODE IN A MULTI-MODE COMMUNICATIONS CLIENT

CROSS-REFERENCE TO RELATED APPLICATIONS

This application claims the benefit of U.S. Provisional Application No. 61/036,240, filed on Mar. 13, 2008 and U.S. Provisional Application No. 61/061,014, filed on Jun. 12, 2008. The entire disclosure of each of the above applications is incorporated herein by reference.

FIELD

The present disclosure relates to client connection to a network, and more specifically to the selection of a preferred access mode to the network.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

A wireless terminal (i.e. user equipment) such as a cellular telephone and/or other wireless devices may access a communications network in multiple access modes. For example, the wireless terminal may access the communications network in the multiple access modes via access methods including, but not limited to, a cellular network, a WiFi access point, a Bluetooth device connected to a network terminal, and/or a WiMax access point. Each of the access modes may be associated with different advantages and/or disadvantages. A multi-mode wireless terminal may be configured to access the communications network in more than one of the multiple access modes. For example, a user of a multi-mode wireless terminal may manually select one of the multiple access modes for connecting to the communications network, and/or the multi-mode wireless terminal may automatically select one of the multiple access modes.

SUMMARY

A wireless terminal includes a wireless interface that is configured to selectively connect the wireless terminal to a network using one of at least two different access modes including a cellular access mode and at least one non-cellular access mode. A mode control module selects the one of the at least two different access modes based at least in part on an access priority signal received from the network.

A method for operating a wireless terminal includes selectively connecting the wireless terminal to a network using one of at least two different access modes including a cellular access mode and at least one non-cellular access mode, and selecting the one of the at least two different access modes based at least in part on an access priority signal received from the network.

A wireless network includes a wireless terminal that is configurable to selectively connect to the wireless network using one of at least two different access modes. The wireless network transmits an access priority signal to the wireless terminal via at least one access point to direct the wireless terminal to select the one of the at least two different access modes.

A method for operating a wireless network includes selectively connecting a wireless terminal to the wireless network using one of at least two different access modes, and transmitting an access priority signal from the wireless network to the wireless terminal via at least one access point to direct the wireless terminal to select the one of the at least two different access modes.

A cellular base station in a wireless network that includes cellular and non-cellular access points is configured to communicate with a wireless terminal. The cellular base station transmits a network access priority signal to the wireless terminal in a cellular access mode. The network access priority signal transmitted by the cellular base station directs the wireless terminal to select a non-cellular access mode and to transfer a communication session to one of the non-cellular access points.

A method for operating a cellular base station in a wireless network that includes cellular and non-cellular access points includes communicating with a wireless terminal, transmitting a network access priority signal from the cellular base station to the wireless terminal in a cellular access mode, and directing the wireless terminal to select a non-cellular access mode and to transfer a communication session to one of the non-cellular access points.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

The present disclosure will become more fully understood from the detailed description and the accompanying drawings, wherein.

DESCRIPTION

The following description is merely provided as an example and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Multi-mode wireless terminals may access a communications network in various ways and may be configured to initiate and/or transfer communication sessions based on one or more sets of preferences. The sets of preferences may include, but are not limited to, user preferences, operator (i.e. a service provider associated with the communications network) preferences, employer preferences, and/or one or more sub-network preferences, such as access network preferences and home network preferences. For example only, preferences of an access network, a home network, and/or an employer network may be provided via respective signals that are transmitted to the wireless terminal.

In addition to user preferences of the wireless terminal, a communications network may include a third generation partnership project (3GPP) Generic Access Network (GAN) that defines a first set of preferences. Voice Call Continuity (VCC) specifications may define a second set of preferences based on seamless transfer between circuit switched and packet switched radio domains. IMS Service Continuity (IMS SC) may define a third set of preferences.

A service level agreement (SLA) between a service provider and a customer operating a plurality of mobile terminals (e.g. a corporation, family, or other organization) may define another set of preferences. Alternatively, the customer may define a set of preferences independent of an SLA (such as via an information technology department of a corporation). Subscription rules provided by a Subscriber Identity Module (SIM) or Over-the-Air (OTA) card may define still another set of preferences. Further preferences may be defined based on operating parameters including, but not limited to, connection quality, application specific requirements, available power, location, and/or time of day (e.g. peak or off-peak).

A wireless terminal according to the present disclosure receives an access priority signal that is transmitted by, for example only, the communications network, and receives multiple sets of preferences. For example, the multiple sets of preferences may include, but are not limited to, user preferences, home network preferences, VCC preferences, IMS SC preferences, customer preferences, SLA preferences, and subscription preferences. The wireless terminal receives each of the sets of preferences and determines a set of operating rules based on the access priority signal and the sets of preferences. For example, the access priority signal may determine an order of priority for selecting between access networks and/or other methods of connecting to the communications network, and/or may determine priorities assigned to each of the sets of preferences.

Figure 1:
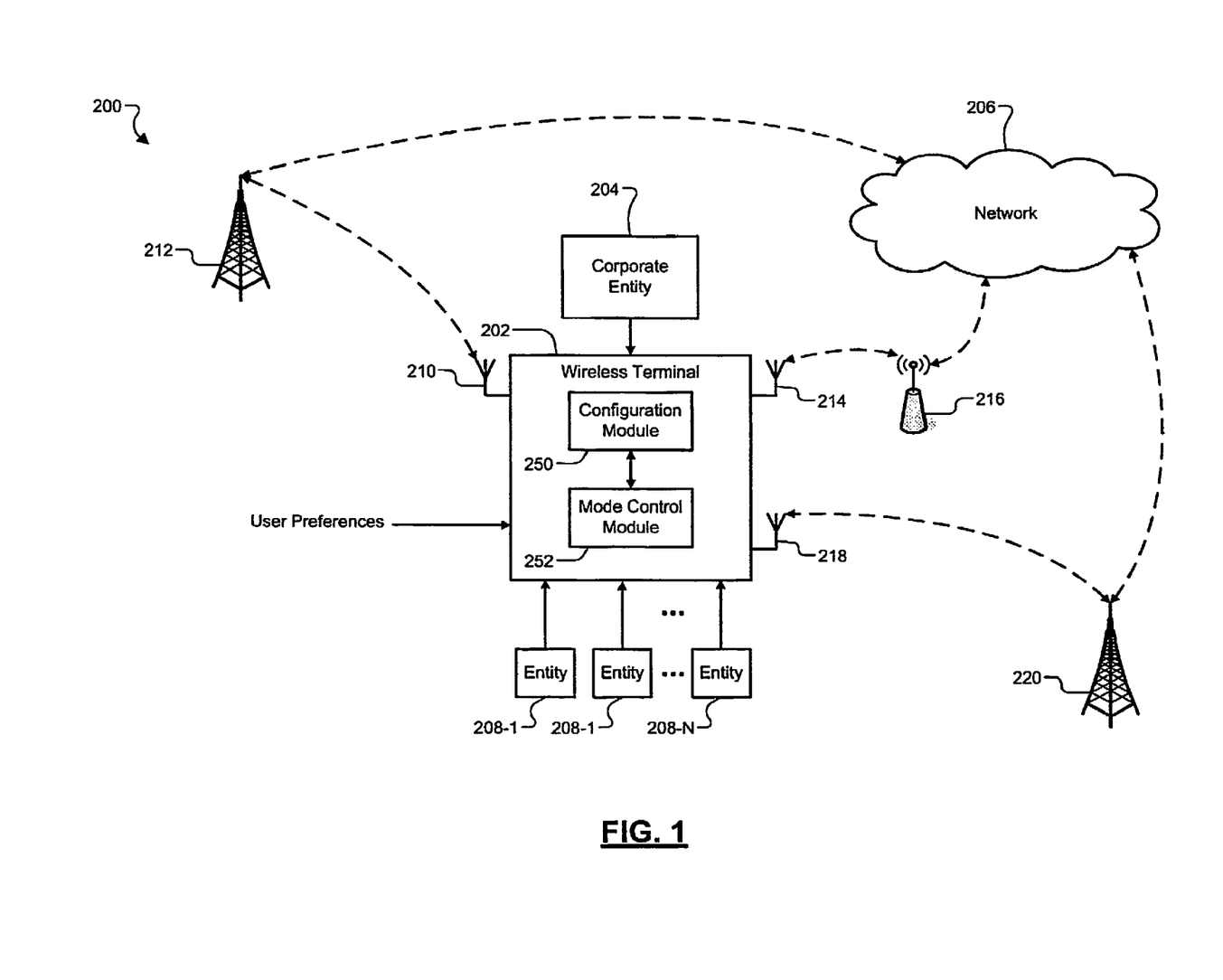
FIG. 1 is a functional block diagram of a wires communications system according to the principles of the present disclosure.

Referring now to FIG. 1, a functional block diagram of a wireless communications system 200 is shown. A wireless terminal 202 is a multi-mode wireless terminal that may communicate with a network via multiple cellular and/or non-cellular connections for voice, data, and multimedia content. The wireless terminal 202 selects between access multiple access modes according to an access priority signal and/or multiple sets of preferences.

For example, the wireless terminal 202 receives preferences from a user, preferences from an employer, such as an information technology (IT) department of a corporate entity 204, and preferences from an operator (e.g. a service provider) of a network 206. The wireless terminal 202 may receive additional preferences from one or more other entities 208-1, 208-2, . . . , and 208-N, referred to collectively as entities 208. For example only, the entities 208 may include, but are not limited to, an SLA and/or SIM/OTA subscriptions. The wireless terminal 202 receives an access priority signal from the network 206. The access priority signal may indicate an order of priority for selecting among operating modes of the wireless terminal 202 and/or an order of priority for selecting among the multiple sets of preferences.

The wireless terminal 202 receives and stores the multiple sets of preferences and operates in various modes based on the preferences and the access priority signal. For example only, the wireless terminal 202 may be configured to initiate certain connections (e.g. voice or data) using a particular connection mode to transition between connection modes for continuity based on the preferences.

For example, the wireless terminal 202 may operate in a cellular mode to connect to the network 206 via a first antenna 210 and a cellular tower 212. The wireless terminal 202 may operate in a WiFi mode to connect to the network 206 via a second antenna 214 and a WiFi access point 216. The wireless terminal 202 may operate in a WiMax mode to connect to the network 206 via a third antenna 218 and a WiMax tower 220. In other implementations, the wireless terminal 202 may connect to the network 206 via one of the antennas and a land-based connection. The wireless terminal 202 may receive the access priority signal from the network 206 via any of the cellular tower 212, the WiFi access point 216, and the WiMax tower 200 while operating in a corresponding one of the operating modes. As used herein, the term access point may refer generally to any of the cellular, WiFi, WiMax or land based connections to network 206.

Some of the received preferences may conflict with other received preferences. For example only, the preferences received from the corporate entity 204 may require that voice calls are initiated via a WiFi or WiMax connection (i.e. using the WiFi access point 216 or the WiMax tower 220, respectively), if available. Conversely, the user preferences may direct the wireless terminal 202 to initiate voice calls via a cellular connection using the cellular tower 212. Accordingly, the wireless terminal 202 may aggregate each set of preferences to generate a set of operating rules based on the access priority signal.

For example, the wireless terminal 202 may assign priorities to each set of preferences based on the access priority signal. For example only, the preferences received from the corporate entity 204 may have a highest priority. User preferences may have a second highest priority. Preferences received from the network 206 may have a lowest priority. The wireless terminal 202 generates the set of operating rules based on the preferences having the highest priority.

In one implementation, the access priority signal transmitted by the network 206 may indicate an order of priority for selecting among the operating modes. The access priority signal may override all other received preferences. Accordingly, the wireless terminal 202 may select among the operating modes to connect to the network 206 in an order based on the access priority signal. In another implementation, the corporate entity 204 assigns the priorities to the various sets of preferences. For example, the corporate entity 204 may transmit the priorities to the wireless terminal 202. The wireless terminal 202 stores the priorities and selects one of the sets of preferences accordingly. When the wireless terminal 202 is not associated with a corporate entity, the network 206 may assign and transmit the priorities to the wireless terminal 202. It is noted that the content of the access priority signal transmitted by different access points may be different; likewise the content of an access priority signal may change over time.

In other implementations, the wireless terminal 202 may determine the priorities based on a dynamic set of rules. For example, the wireless terminal 202 may assign the highest priority to the corporate entity 204 during certain times of the day (e.g. during normal work hours), and assign the highest priority to the user preferences during other times of the day. Similarly, the wireless terminal 202 may assign the highest priority to the corporate entity 204 when the wireless terminal 202 is in a first location (e.g. within a threshold distance of the corporate entity 204), and assign the highest priority to the user preferences when the wireless terminal 202 is in a second location (e.g. at home of the user).

The wireless terminal 202 may include a configuration module 250 and a mode control module 252. The configuration module 250 receives the multiple sets of preferences and the access priority signal. The configuration module 250 determines a selected operating mode for connecting to the network 206 based on the sets of preferences and the access priority signal. The mode control module 252 connects the wireless terminal 202 to the network 206 based on the selected operating mode received from the configuration module 250.

For example only, preferences of the corporate entity 204 may include, but are not limited to: a preference for connection types managed by the corporate entity 204; a preference for a particular service provider; a preference for connection types that allow connections of a manageability client; a preference for secure access points (APs); and a preference for GAN enabled connections.

For example only, user preferences may include, but are not limited to: a preference for highest potential voice quality connections for voice calls; a preference for lowest cost per data unit for non voice calls; a preference for a connection having a minimum resolution for video streaming; a preference for a particular AP (e.g. home); a preference for a particular service provider or continuity with the service provider; and a preference for secured links for e-mail.

For example only, network (i.e. operator) preferences may include, but are not limited to: a preference for a cellular preferred profile for GAN-enabling; a preference for IP access networks; a preference for APs associated with the network 106; a preference for prepaid data transfers; and a preference for limitations for subscribed services.

Assigned priorities may apply differently to different actions. For example, a first set of priorities may apply to preferences for link rules (i.e. rules determining how links are established and/or transferred). The link rules may include, but are not limited to: IP access; and highest voice quality for voice calls; lowest cost per data unit for non voice connections. For example only, an aggregated link rule set may direct a preference for highest voice quality for voice calls and lowest cost per data unit among available IP access networks for non voice connections.

A second set of priorities may apply to preferences for network rules (i.e. rules associated with a particular network connection). The network rules may include, but are not limited to: a preference for networks managed by the corporate entity 204; a preference for particular APs; and a preference for a particular service provider; a preferred profile for GAN-enabling. For example only, an aggregated network rule set may direct a preference for networks managed by the corporate entity 204, followed by preferences for a particular service provider, secure APs, APs associated with the corporate entity 204, and a preferred profile for GAN-enabling.

A third set of rules may apply to preferences for particular applications. Application related rules may include, but are not limited to: a preference for networks allowing connections of a manageability client; a preference for subscribed services; a preference for secure links for email; a preference for highest voice quality for voice calls; a preference for a minimum resolution for video streaming; and a preference for lowest cost per data unit for non voice and non video connections. Because the above application related rules are non-conflicting (i.e. each rule applies to a different application), an aggregated application related rule set is not required.

Figure 2:
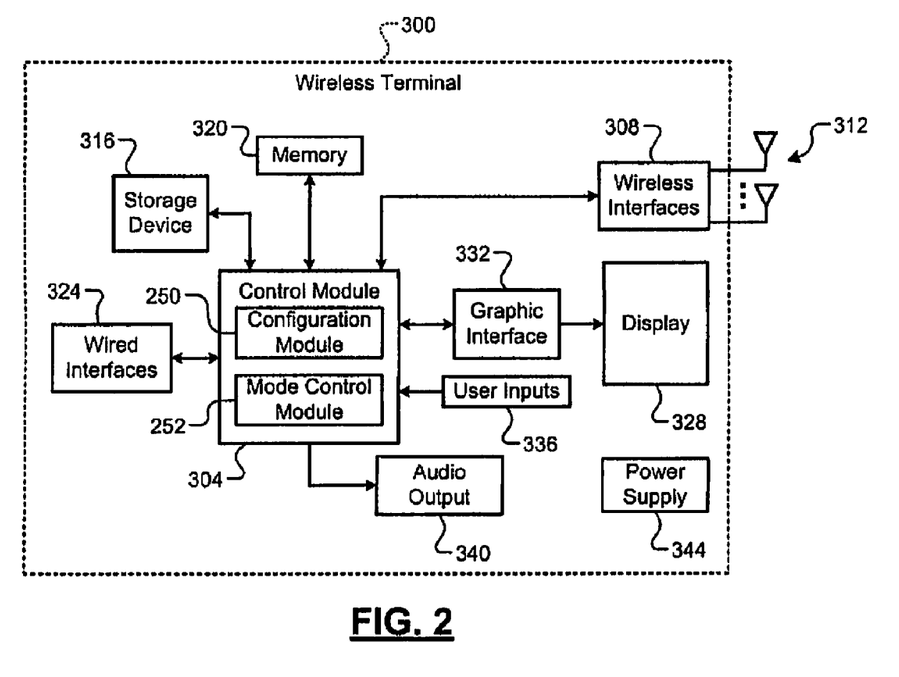
FIG. 2 is a functional block diagram of a wireless terminal according to the principles of the present disclosure.

Referring now to FIG. 2, a functional block diagram of a wireless terminal 300 configured in accordance with the present disclosure is illustrated. For example only, the wireless terminal 300 may be a mobile telephone (e.g. a cellular telephone), a mobile media player device, a portable computer, or any other wireless device, whether portable or not, such as a desktop computer. The wireless terminal 300 includes a control module 304.

The control module 304 controls wireless interfaces 308, which communicates wirelessly with other devices antennas 312. For example, the wireless interfaces 308 may communicate via cellular, WiFi, and/or WiMax connections using respective ones of the antennas 312, and may allow for implementation of other wireless protocols, such as Bluetooth. The wireless terminal 300 may communicate with the network 206 (as shown in FIG. 1) via the wireless interfaces 308 using one or more cellular and non-cellular connections. The control module 304 may include a processor that executes instructions stored in a storage device 316.

The control module 304 may store instructions and data in a memory 320, such as volatile dynamic random access memory (DRAM) and/or nonvolatile flash memory. The control module 304 may control wired interfaces 324, which may include universal serial bus (USB) and IEEE 1394 (fire wire). The control module 304 may output information to a display 328 using a graphic interface 332. The graphic interface 332 may include a graphics accelerator.

The control module 304 receives user inputs 336, which may include buttons, a keyboard, a touch pad, a touch screen, etc. The control module 304 may also output audio to an audio output 340, which may include a transducer, such as a speaker, and/or a wired audio connector. Components of the wireless terminal 300 receive power from a power supply 344, which may include a battery.

The control module 304 receives multiple sets of preferences and the access priority signal as described above in FIG. 1. For example, the control module 304 receives the access priority signal from the network 306 via the wireless interfaces 308. The control module 304 may receive user preferences via the user inputs 336. The control module 304 may receive other sets of preferences via the wireless Interfaces 308 and the antennas 312. The control module 304 may store preferences in the storage device 316 and/or the memory 320. For example only, the storage device 316 may store a default set of preferences, such as the user preferences. The control module 304 may operate according to the user preferences upon power up.

The storage device 316 and/or the memory 320 may store other preferences such as preferences received from the wireless interfaces 308 after power up. The control module 304 generates an aggregated rule set based on the multiple sets of preferences and/or the access priority signal and stores the aggregated rule set in the memory 320. For example, the control module 304 may receive assigned priorities via access priority signal. The control module 304 may receive the access priority signal upon power up, periodically, during initiation of a call and/or data transfer, or based on other conditions (e.g. location or time of day).

The control module 304 includes the configuration module 250 (e.g. a configuration handler) and the mode control module 252. The configuration module 250 receives various sets of preferences, such as stored preferences (e.g. preferences previously stored in the storage device 316 and/or the memory 320), user preferences (e.g. via the user inputs 336, and corporate entity and/or home network preferences (e.g. via the wireless interface 308). The configuration module 250 also receives a set of assigned priorities for the various sets of preferences. For example, the configuration module 250 may operate according to assigned priorities previously stored in the storage device 316 and/or the memory 320.

Additionally, the configuration module 250 may operate according to assigned priorities received dynamically. For example, the network 206 or the corporate entity 204 may transmit the access priority signal, which may include assigned priorities. The configuration module 250 may receive the assigned priorities upon initiating a particular application (e.g. initiating a call or data transfer), upon power up, periodically, and/or upon other conditions (e.g. such as time and location). In other implementations, a user may program assigned priorities via the user inputs 336.

The configuration module 250 generates an aggregated set of rules based on the assigned priorities and the multiple sets of preferences. For example, when a first set of preferences includes a preference for a connection having a lower cost and a second set of preferences includes a preference for a connection having a higher voice quality, the aggregated set of rules includes the preference associated with the higher priority.

For illustration purposes, a first set of preferences may include a preference for secure APs, followed by a preference for lowest cost per data unit, for example. A second set of preferences may include a preference for secure APs, followed by a preference for highest link quality, for example. Accordingly, the first preference for each of the sets is the same (i.e. secure APs), and the first preference of the aggregated set of rules is secure APs. If the first set of preferences has a higher priority, the second preference of the aggregated set of rules will be lowest cost per data unit. Conversely, if the second set of preferences has a higher priority, the second preference of the aggregated set of rules will be highest link quality.

In this manner, the configuration module 250 generates the aggregated set of rules, taking into account the assigned priorities for each of the sets of preferences. In other implementations, the assigned priorities may include a range of acceptable values. For example, a preference for lowest cost per data unit may include a range for acceptable costs per data unit, and/or a threshold cost. When a preference from a second set of preferences has a lower priority, the configuration module 250 may still include other preferences in the aggregated set of rules to the extent that the other preferences do not directly conflict with preferences having a higher priority. For example, the aggregated set of rules may require that the wireless terminal 300 first locate connections having costs below a threshold to satisfy the highest priority preference, and then select the highest quality link from among the located connections to satisfy the lower priority preference. Although the above example only includes two sets of preferences for illustration purpose, it is noted that the configuration module 250 may receive any number of sets of preferences and assigned priorities and generate the aggregated set of rules accordingly.

The mode control module 252 operates according to the aggregated set of rules. For example, the configuration module 250 may store the aggregated set of rules in the storage device 316 and/or the memory 320. The mode control module 252 selectively activates and transitions the wireless terminal 300 between communication modes such as cellular, WiFi, and/or WiMAX based on the aggregated set of rules generated by the configuration module 250.

Figure 3:
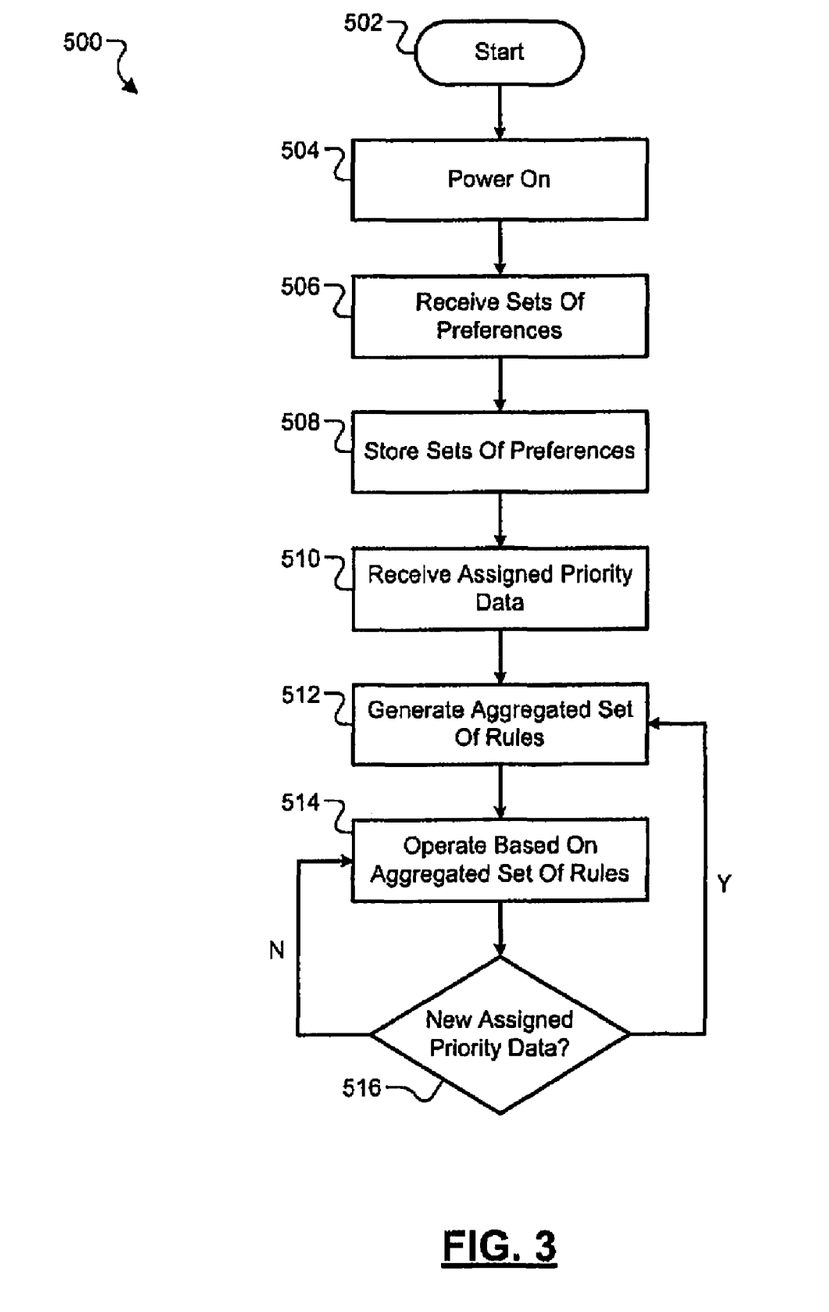
FIG. 3 is a flowchart illustrating exemplary steps performed in an aggregation method according to the principles of the present disclosure.

Referring now to FIG. 3, an aggregation method 500 in accordance with an embodiment of the disclosure begins in step 502. In step 504, a wireless terminal powers on. In step 506, the wireless terminal receives one or more sets of preferences from, for example only, memory, user inputs, and/or a wireless interface. In step 508, the wireless terminal stores the sets of preferences. In step 510, the wireless terminal receives assigned priority data, such as an access priority signal. In step 512, the wireless terminal generates an aggregated set of rules according to the sets of preferences and the assigned priority data. In step 514, the wireless terminal operates based on the aggregated set of rules. In step 516, the wireless terminal determines whether new assigned priority data is received. If true, the method 500 continues to step 512. If false, the method 500 continues to step 514.

Figure 4:
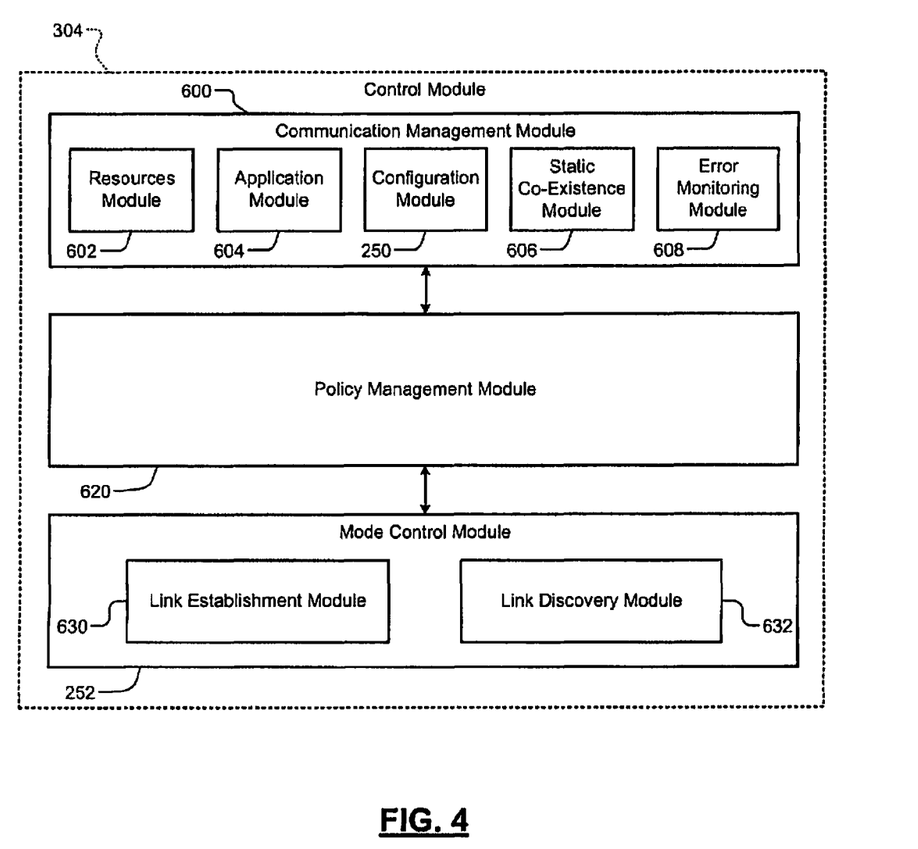
FIG. 4 is a functional block diagram of a control module including a policy management module according to the principles of the present disclosure.

Referring now to FIG. 4, when the control module 304 operates according to the user preferences (e.g. when the user preferences are assigned the highest priority), the control module 304 may operate according to other parameters in addition to the user preferences. For example, the other parameters may include, but are not limited to, IP connection quality, cost, power consumption (e.g. power per bit and/or overhead power and resources required to enable a link), network status, co-existence rules, application requirements, security, and a minimum quality of service (QoS). The control module 304 may detect and select wireless links to connect to the network 206 according to both the user preferences and the other parameters.

The control module 304 may include various communications management modules 600 including, but not limited to, the configuration module 250, a resources module 602, an application module 604, a static co-existence module 606, and an error monitoring module 608. Each of the management modules 600 outputs parameters to a policy management module 620.

Each of the parameters may be based in part on QoS requirements of any active applications and/or services. For example, the configuration module 250 may output parameters based on the user preferences for mode selection as described above in FIGS. 1-3. The resources module 602 outputs parameters based on resource statuses and requests, including, but not limited to, available memory, battery level, and power consumption. The application module 604 outputs parameters based on requirements of specific applications and/or services. The static co-existence module 606 outputs parameters based on requirements of co-existence of two or more simultaneous network connections. The error monitoring module 608 outputs parameters based on error events. Each of the management modules 600 may generate weights that correspond to each of the parameters. For example only, a user may configure each of the weights.

The policy management module 620 receives the parameters and corresponding weights from the management modules 600. The policy management module 620 selects an available link (i.e. type of connection) based on the parameters and weights. For example, the policy management module 620 may evaluate each available link based on the parameters and weights to generate an evaluation score for each link. For example only, the policy management module 620 may generate the evaluation scores based on an evaluation function that is applied to each of the links. The policy management module 620 selects the link having the highest evaluation score.

The mode control module 252 connects to and transitions between available links based on the selected link. For example, the mode control module 252 may include a link establishment module 630 and a link discovery module 632. For example, the link establishment module 630 communicates with wireless interfaces associated with each of the links (e.g. cellular, WiFi, and/or WiMax interfaces) to establish active links. The link establishment module 630 may receive an indication of the selected link from the policy management module 620. In other implementations, the link establishment module 630 may receive a prioritized list of selected links arranged according to the evaluation scores. For example, when the link with the highest evaluation score is not available, the link establishment module 630 may connect to the next link on the list. The link establishment module 630 may communicate link statuses, current active network lists, success and/or fail indications of link attempts, tunnel establishment and drop request indications, and setup, teardown, and handover requests to the policy management module 620.

The link discovery module 632 determines link measurements (e.g. detects acceptable links) and schedules link measurements. For example, the link discovery module 632 maintains a database of active and available links and networks and corresponding quality measurements, service attributes, and geographical locations to optimize link discovery and reduce power consumption. The link discovery module 632 may update the database based on parameters including, but not limited to, a list of available radios and types (e.g. cellular, WiFi, WiMAX, etc), power resource status, and a set of triggers for scheduling (e.g. location change, QoS change, user requests, and physical link deterioration).

Figure 5:
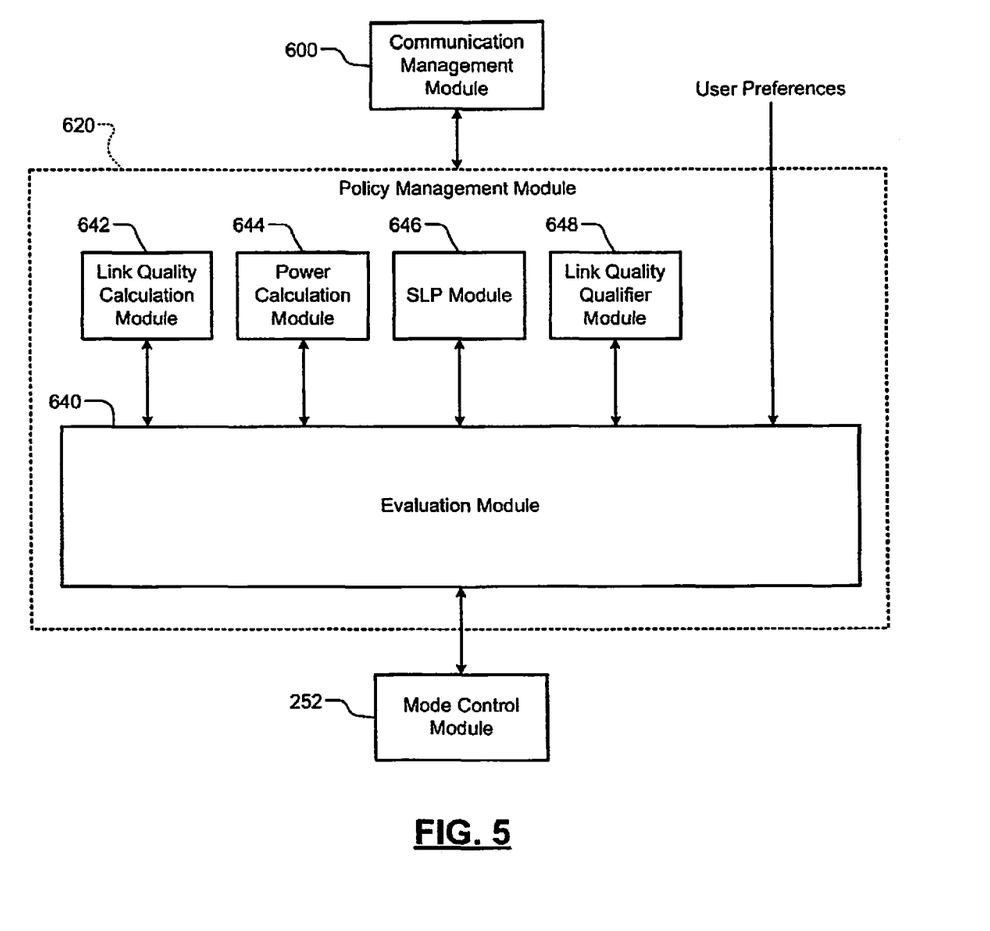
FIG. 5 is a functional block diagram of a policy management module according to the principles of the present disclosure.

Referring now to FIG. 5, the policy management module 620 includes an evaluation module 640 that generates an evaluation score for each potential link. The policy management module 620 further includes a link quality calculation module 642, a power calculation module 644, a service link priority (SLP) module 646, and a link quality qualifier module 648.

Figure 6:
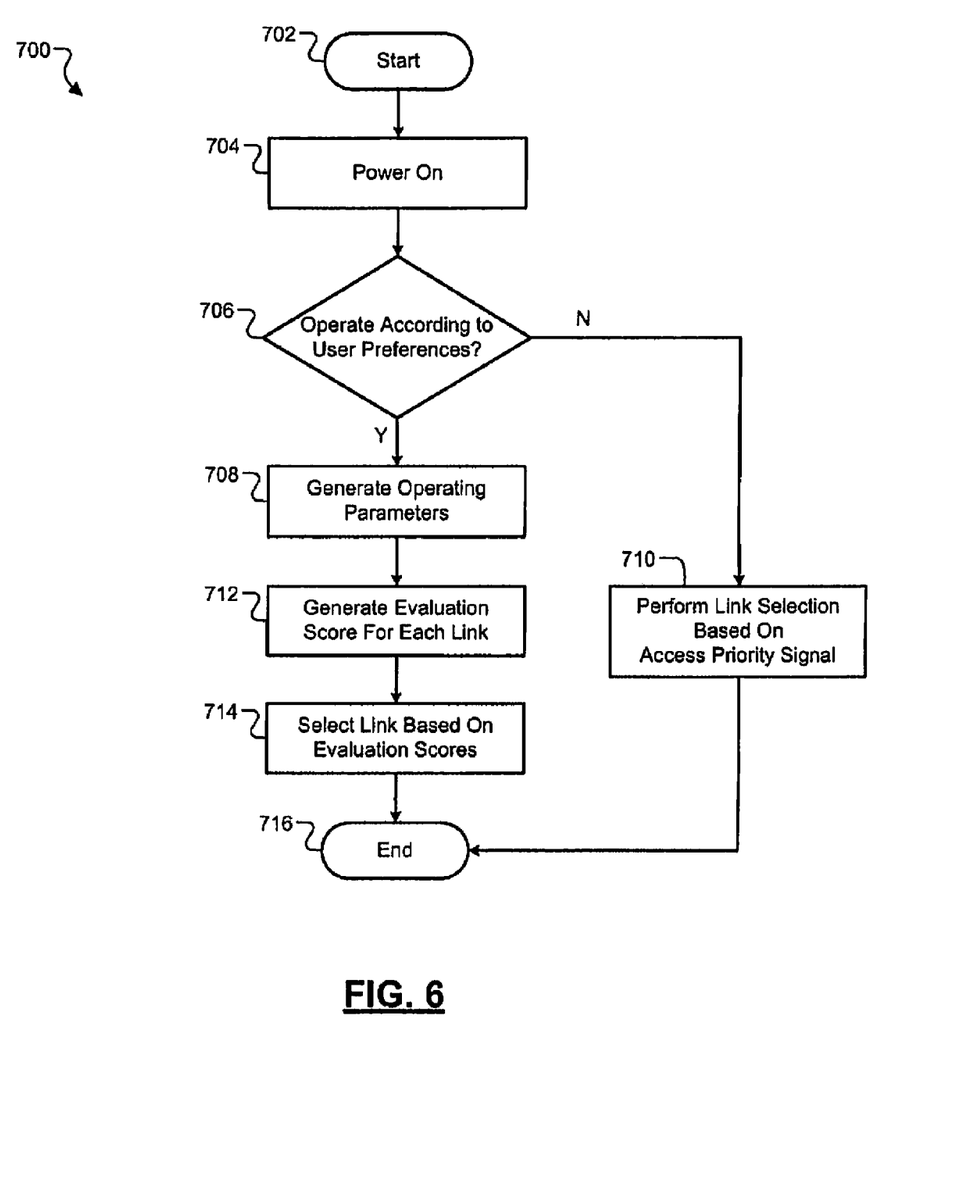
FIG. 6 is a flowchart illustrating exemplary steps performed in a link selection method according to the principles of the present disclosure.

The evaluation module 640 generates an evaluation score for each link based on inputs from the modules 642, 644, 646, and 648, as well as the user preferences (e.g. received from the configuration module 250), using an evaluation function. The inputs from the modules 642, 644, 646, and 648 may be based on the parameters received from the management modules 600 as shown in FIG. 6. For example, link quality calculation module 642 may generate a link quality Q. The power calculation module 644 may generate a power/energy per bit $P_b$. The SLP module 646 may generate a service link priority score SLPu that is based on the user preferences. The link quality qualifier module 648 may generate a qualifier filter q based on a class of service (CoS).

For example, services with similar QoS requirements may be grouped within a CoS. For example only, voice over IP (VoIP) and video conferencing may be grouped in a first CoS having the highest QoS requirements (e.g. a conversational CoS). Video streaming may be included in a second CoS (e.g. a streaming CoS). Web browsing may be included in a third CoS (e.g. an interactive CoS). File downloads may be included in a fourth CoS (e.g. a background CoS). Accordingly, the qualifier filter q may be based on the CoS of a requested service.

The evaluation module 640 generates an evaluation score $\Gamma$ based on the inputs. For example only, the evaluation module 640 may generate the evaluation score $\Gamma$ for a link i based on:

$$\Gamma(linki) = \left(w_q \cdot \log(Q \cdot T_0) + w_p \cdot \log\left(\frac{P_b}{P_0}\right)\right) \cdot \pi(q) + w_u \cdot SLP_u, \quad \text{Equation 1}$$

where $w_q$ is a weight for the CoS qualifier filter q, $T_0$ is a time, $w_p$ is a weight for power, $P_0$ is power leakage, $w_u$ is a weight for the service link priority score SLPu, and $\Pi$ is a 1 or 0. For example, $\Pi$ may indicate whether the CoS of the requested service supports a link type associated with the link i. For example only, a sum of all weights may equal 1. If $\Pi$ is 0, the CoS does not support the link type, the first term becomes 0, and $\Gamma = w_u * SLPu$. Similarly, when $w_u = 1$, the first term becomes 0 and $\Gamma = SLPu$.

The evaluation module 640 generates an evaluation score $\Gamma$ for all available links and controls link selection according to the evaluation scores. The evaluation module 640 may make link decisions further based on, for example, a minimum time between link decisions, link discovery and loss, and changes in service demands. The evaluation module 640 communicates with the link establishment module 630 to initiate link establishment based on the link selections. The evaluation module 640 may receive information associated with link establishment success and/or failure from the link establishment module 630. The evaluation module 640 communicates with the link discovery module 632 to exchange information associated with available links and media access controller (MAC) statistics.

The link quality calculation module 642 generates the link quality Q for each available link. The link quality Q may be based on, for example, throughput performance, measured delay, error rate (e.g. as reported by a MAC, and previous and active link connections. When previous and active link connection information is not available, default values (e.g. manufacturer provided values) for each link may be used. The link quality calculation module 642 may generate the link quality Q for a link i based on:

$$Q(linki) = \frac{w_T}{T \cdot [1 - R_{PACKET\_LOSS}]} + \frac{[1 - w_T] \cdot D_{MAC}}{BlockSize}, \quad \text{Equation 2}$$

where T is measured throughput, $D_{MAC}$ is a measured MAC delay, blocksize is size of a MAC block in bits, $w_t$ is a weight for measured throughput, and $R_{PACKET\_LOSS}$ is a reported packet loss.

The power calculation module 644 generates the power per bit $P_b$ for each available link. The power per bit $P_b$ may be based on, for example only, default parameters (e.g. manufacturer provided values) for average power and sustainable throughput. The default parameters may be adjusted based on actual performance during previous and active link connections.

The SLP module 646 may generate a service link priority score SLPu for each link based on the user preferences. For example, each link may be assigned the service link priority score SLPu based on link preferences associated with each of N different services. The link preferences are based on, for example, the user preferences provided by the user. For each of the N services, each of M link types may be assigned a preference 1 through M.

For example, for VoIP service, the user preferences may be WiMax: 1; WiFi: 2; CDMA (code division multiple access): 3; W-CDMA: 4; and GSM (global system for mobile communications): 5. For video conferencing service, the user preferences may be GSM, W-CDMA, and CDMA: 3; WiFi: 4; and WiMax: 5. The service link priority score SLPu for each link may be based on the user preferences for both VoIP and video conferencing. The service link priority score SLPu may be a sum of the user preference associated with each service. For example, the service priority score SLPu for each of the services may be GSM: 8; W-CDMA: 7; and WiFi, WiMax, and CDMA: 6.

The SLP module 646 may generate the service link priority score SLPu for a link i for services based on:

$$SLPu(link i, \{services\}) = \left[ 5 - \frac{1}{\{services\}} \cdot \sum_{service=0}^{N} preference \right] \cdot \frac{1}{2} - 1.$$

Equation 3

The link quality qualifier module 648 may generate the qualifier filter q for each link. For example, the quality filter q may be a step function based on link quality parameters including, but not limited to, throughput, delay, security, and error rate. Accordingly, the quality filters q for each link correspond to each parameter for multiple classes of service. When only a single link is active, multiple quality filters q may correspond to the multiple classes of service for the single link. For example only, the link quality qualifier module 648 may generate the qualifier q for a link i, a CoS j, and a parameter k based on:

$$q(link i, CoS j) = \pi_k \cup [parameter_k(link i, CoS j) - min\ parameter_k(CoS j)],$$

Equation 4 where min parameter is a minimum threshold for the parameter.

Referring now to FIG. 7, a link selection method 700 begins in step 702. In step 704, a wireless terminal powers on. In step 706, the wireless terminal determines whether to operate according to the user preferences. If true, the method 700 continues to step 708. If false, the method 700 continues to step 710. In step 710, the wireless terminal performs link selection based on an access priority signal. In step 708, the wireless terminal generates operating parameters for each available link, including, but not limited to, power per bit, link quality, CoS qualifiers, and service link priority score. In step 712, the wireless terminal generates an evaluation score for each available link based on the parameters and the user preferences. In step 714, the wireless terminal selects a link based on the evaluation scores. The method 700 ends in step 716.

The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A wireless terminal comprising:
a wireless interface that is configured to selectively connect the wireless terminal to a remote communications network, via at least one of a base station and an access point, using one of at least two different access modes including a cellular access mode and at least one non-cellular access mode, and to receive an access priority signal from the remote communications network, the access priority signal being transmitted to the wireless terminal from the remote communications network via at least one of the base station and the access point; and
a mode control module that selects the one of the at least two different access modes based at least in part on the access priority signal received from the remote communications network.

2. The wireless terminal of claim 1 wherein the at least one non-cellular access mode includes at least one of a WiFi access mode, a WiMax access mode, and a Bluetooth access mode.

3. The wireless terminal of claim 1 wherein the wireless interface is configured to selectively connect the wireless terminal to the remote communications network via a land-based access connection.

4. The wireless terminal of claim 1 wherein the access priority signal indicates an order of priority for selecting between the at least two different access modes.

5. The wireless terminal of claim 1 further comprising:
a configuration module that:
receives first and second sets of preferences associated with selection of the at least two different access modes; and
receives the access priority signal that includes assigned priorities associated with the first and the second sets of preferences,
wherein the mode control module selects the one of the at least two different access modes based on the assigned priorities and the first and the second sets of preferences.

6. The wireless terminal of claim 5 wherein the configuration module generates aggregated preferences based on the first and the second sets of preferences and the assigned priorities.

7. The wireless terminal of claim 6 wherein the mode control module selects the one of the at least two different access modes based on the aggregated preferences.

8. The wireless terminal of claim 5 wherein the mode control module selects the one of the at least two different access modes based on at least two of user preferences, employer preferences, and network preferences.

9. The wireless terminal of claim 5 wherein the mode control module selects the one of the at least one two different access modes based on assigned priorities associated with at least one of the network and an employer.

10. The wireless terminal of claim 5 wherein:
at least one of the first and the second sets of preferences includes user preferences; and
the mode control module selects the one of the at least two different access modes based on the access priority signal and further based on a priority assigned to the user preferences.

11. The wireless terminal of claim 10 wherein the mode control module selects between the at least two different access modes based on first operating parameters when the access priority signal indicates that the priority assigned to the user preferences is greater than a threshold.

12. The wireless terminal of claim 11 wherein the first operating parameters include at least one of connection quality, application requirements, quality of service, cost, security, and power consumption associated with each of the at least two different access modes.

13. The wireless terminal of claim 1 wherein the wireless terminal includes a cellular telephone.

14. A method for operating a wireless terminal, the method comprising:

selectively connecting the wireless terminal to a remote communications network, via at least one of a base station and an access point, using one of at least two different access modes including a cellular access mode and at least one non-cellular access mode;

receiving an access priority signal from the remote communications network, the access priority signal being transmitted to the wireless terminal from the remote communications network via at least one of the base station and the access point; and selecting the one of the at least two different access modes based at least in part on the access priority signal received from the remote communications network.

15. The method of claim 14 wherein the at least one non-cellular access mode includes at least one of a WiFi access mode, a WiMax access mode, and a Bluetooth access mode.

16. The method of claim 14 further comprising:

receiving first and second sets of preferences associated with selection of the at least two different access modes;

receiving the access priority signal that includes assigned priorities associated with the first and the second sets of preferences; and selecting the one of the at least two different access modes based on the assigned priorities and the first and the second sets of preferences.

17. The method of claim 16 wherein at least one of the first and the second sets of preferences includes user preferences and further comprising:

selecting the one of the at least two different access modes based on the access priority signal and further based on a priority assigned to the user preferences.

18. The method of claim 17 further comprising selecting between the at least two different access modes based on first operating parameters when the access priority signal indicates that the priority assigned to the user preferences is greater than a threshold.

* * * * *